(12) United States Patent
Deges

(10) Patent No.: US 12,219,919 B2
(45) Date of Patent: Feb. 11, 2025

(54) SYSTEM AND METHOD FOR SECURING CALF HUTCHES

(71) Applicant: MJE, LLC, Montezuma, KS (US)

(72) Inventor: Stephen L. Deges, Dodge City, KS (US)

(73) Assignee: MJE, LLC, Montezuma, KS (US)

( * ) Notice: Subject to any disclaimer, the term of this patent is extended or adjusted under 35 U.S.C. 154(b) by 0 days.

(21) Appl. No.: 18/457,131

(22) Filed: Aug. 28, 2023

(65) Prior Publication Data

US 2023/0397567 A1    Dec. 14, 2023

Related U.S. Application Data

(63) Continuation of application No. 17/939,261, filed on Sep. 7, 2022, now Pat. No. 11,771,048, which is a continuation of application No. 16/735,076, filed on Jan. 6, 2020, now Pat. No. 11,439,119, which is a continuation-in-part of application No. 16/374,325, filed on Apr. 3, 2019, now Pat. No. 11,439,118.

(51) Int. Cl.
  *A01K 1/00* (2006.01)
  *A01K 1/02* (2006.01)
  *E05B 15/00* (2006.01)

(52) U.S. Cl.
  CPC .............. *A01K 1/0088* (2013.01); *A01K 1/02* (2013.01); *E05B 15/0093* (2013.01)

(58) Field of Classification Search
  CPC .......... A01K 1/0088; A01K 1/02; B61G 3/24; F16G 11/101; F16G 11/103; F16G 11/105; F16G 11/10; F16G 11/02; F16G 11/046; F16G 11/048; F16G 11/12; E05B 73/0005; E05B 15/0093; Y10T 292/283; Y10T 292/702; Y10T 292/106
  USPC ........................................ 292/216, 173, 230
  See application file for complete search history.

(56) References Cited

U.S. PATENT DOCUMENTS

| | | | | |
|---|---|---|---|---|
| 4,254,975 A | * | 3/1981 | Miller | E05B 73/0005 292/264 |
| 6,408,796 B1 | * | 6/2002 | Hampel | A01K 1/0035 119/482 |
| 7,882,807 B2 | * | 2/2011 | Michels | A01K 1/02 119/500 |
| 2005/0241593 A1 | * | 11/2005 | Kaura | A01K 1/0088 119/496 |

* cited by examiner

*Primary Examiner* — Joshua J Michener
*Assistant Examiner* — Nicole Paige MacCrate
(74) *Attorney, Agent, or Firm* — HOVEY WILLIAMS LLP

(57) ABSTRACT

A securement system for securing one or more calf hutches is provided. The securement system includes latch assemblies and a line. The latch assemblies are configured to be attached to the calf hutches and comprise receiver flanges and latch arms. Each receiver flange includes a vertically-extending plate defining a locking slot with an open end. Each latch arm may be shifted between a closed position in which it blocks the open end of the locking slot and an open position in which it does not block the open end of the locking slot. Each latch arm is biased to the closed position.

11 Claims, 10 Drawing Sheets

SYSTEM AND METHOD FOR SECURING CALF HUTCHES

RELATED APPLICATIONS

This patent application is a continuation and claims priority benefit to co-pending U.S. patent application Ser. No. 17/939,261, filed Sep. 7, 2022, and entitled "SYSTEM AND METHOD FOR SECURING CALF HUTCHES", which is a continuation of U.S. patent application Ser. No. 16/735,076, filed Jan. 6, 2020, and entitled "SYSTEM AND METHOD FOR SECURING CALF HUTCHES", which is a Continuation-In-Part (CIP) of and claims priority to all common subject matter of U.S. patent application Ser. No. 16/374,325, filed Apr. 3, 2019, and entitled "SYSTEM AND METHOD FOR SECURING CALF HUTCHES". The contents of all of these applications are hereby incorporated in their entireties by reference herein.

BACKGROUND

Calf hutches are floorless structures that are used to house and separate calves shortly after birth to protect them from disease during early development and from weather conditions. Being floorless and positioned in fields, they are prone to gusts of wind lift them up and knock them over. This can cause injury to and loss of the calves housed in the calf hutches. Calf hutches can be secured to the ground with ground-engaging anchors or spikes or with other devices, but installing and removing such devices is time-consuming and tedious.

The background discussion is intended to provide information related to the present invention which is not necessarily prior art.

SUMMARY

The present invention solves the above-described problems and other related problems and provides a distinct advance in the art of calf hutches. More particularly, the present invention provides an improved securement system for securing one or more calf hutches to a ground surface. The invention also provides a novel method of securing a calf hutch to a ground surface.

A securement system constructed in accordance with an embodiment of the present invention broadly includes a latch assembly for each calf hutch, a line, and a ratchet assembly. Each latch assembly is configured to be attached to its calf hutch and comprises a receiver flange and a latch arm. The receiver flange includes a locking slot with an open end. The latch arm is pivotally attached to the receiver flange and may be shifted between a closed position in which it blocks the open end of the locking slot and an open position in which it does not block the open end of the locking slot. The latch arm is biased to the closed position.

The line may be secured to at least one anchoring structure such as a post and may be urged against the latch arm of one of the latch assemblies to shift the latch arm from its closed position to its open position to allow a portion of the line to enter the open end of the locking slot and be captured by the latch assembly when the latch arm shifts back to its closed position to thereby secure the line in the locking slot and thus the calf hutch on the ground surface. This may then be repeated for each of the other line assemblies. The line may then be tightened with the ratchet assembly to provide a downward force on each latch and its respective calf hutch, thereby holding the calf hutches in place and preventing them from being lifted up and/or knocked over. By using the latch assemblies of the present invention, the calf hutches can be rapidly and individually secured or unsecured to the ground surface.

A method of securing a plurality of calf hutches to a ground surface according to embodiments of the present invention broadly comprises securing a first end of a line to at least one anchoring structure; urging a first portion of the line against a latch arm of a first latch assembly attached to a top portion of a first calf hutch so that the latch arm shifts from a closed position to an open position to allow the first portion of the line to enter a locking slot of the first latch assembly and be captured by the first latch assembly when the latch arm shifts back to the closed position; and urging a second portion of the line against a latch arm of a second latch assembly attached to a top portion of a second calf hutch so that the latch arm shifts from a closed position to an open position to allow the second portion of the line to enter a locking slot of the second latch assembly and be captured by the second latch assembly when the latch arm shifts back to the closed position. The line may also be tightened to provide a downward force on each latch and its respective calf hutch, thereby holding the calf hutches in place and preventing them from being knocked over.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
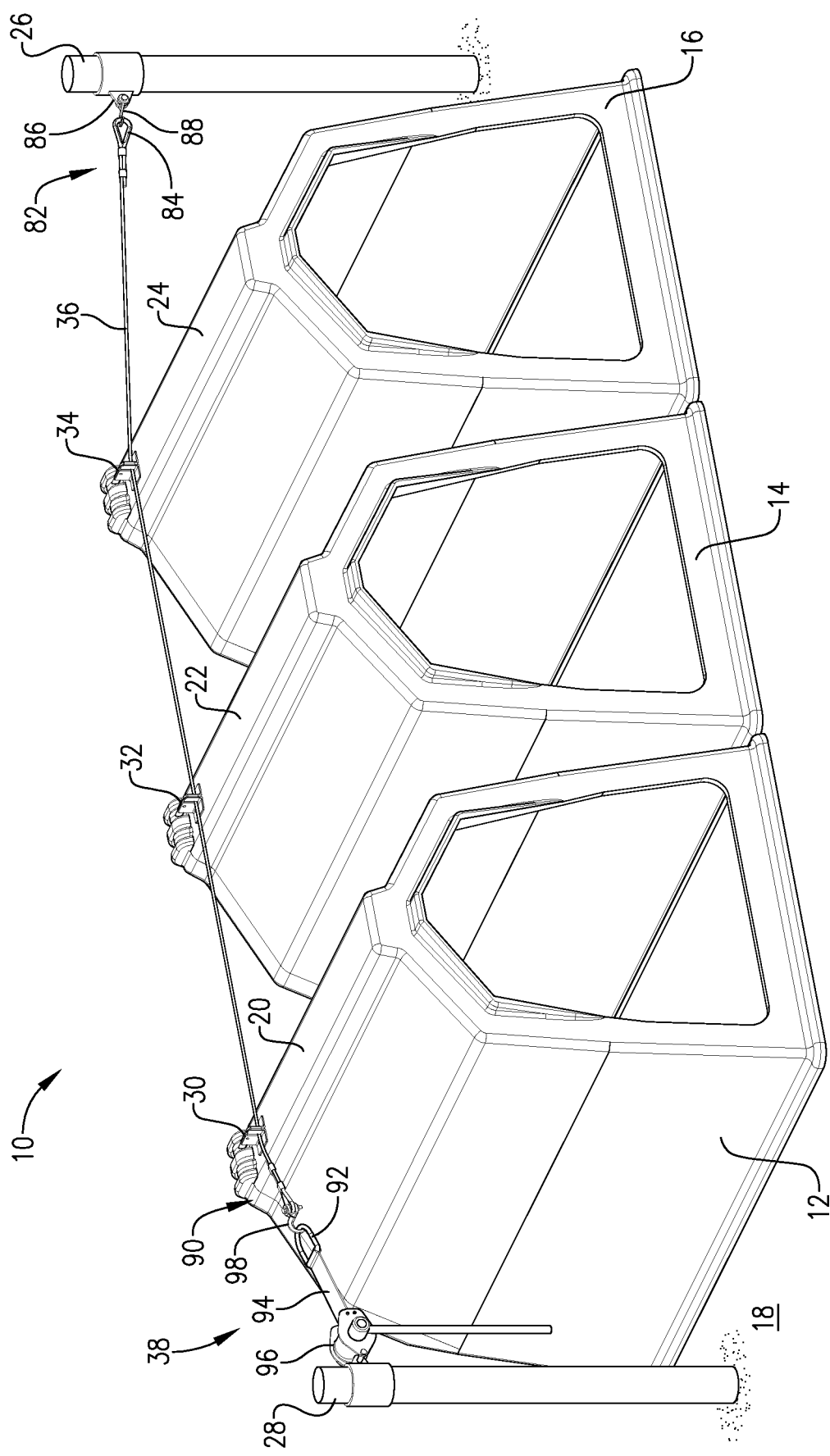
FIG. 1 is a perspective view of a securement system for securing one or more calf hutches constructed in accordance with embodiments of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
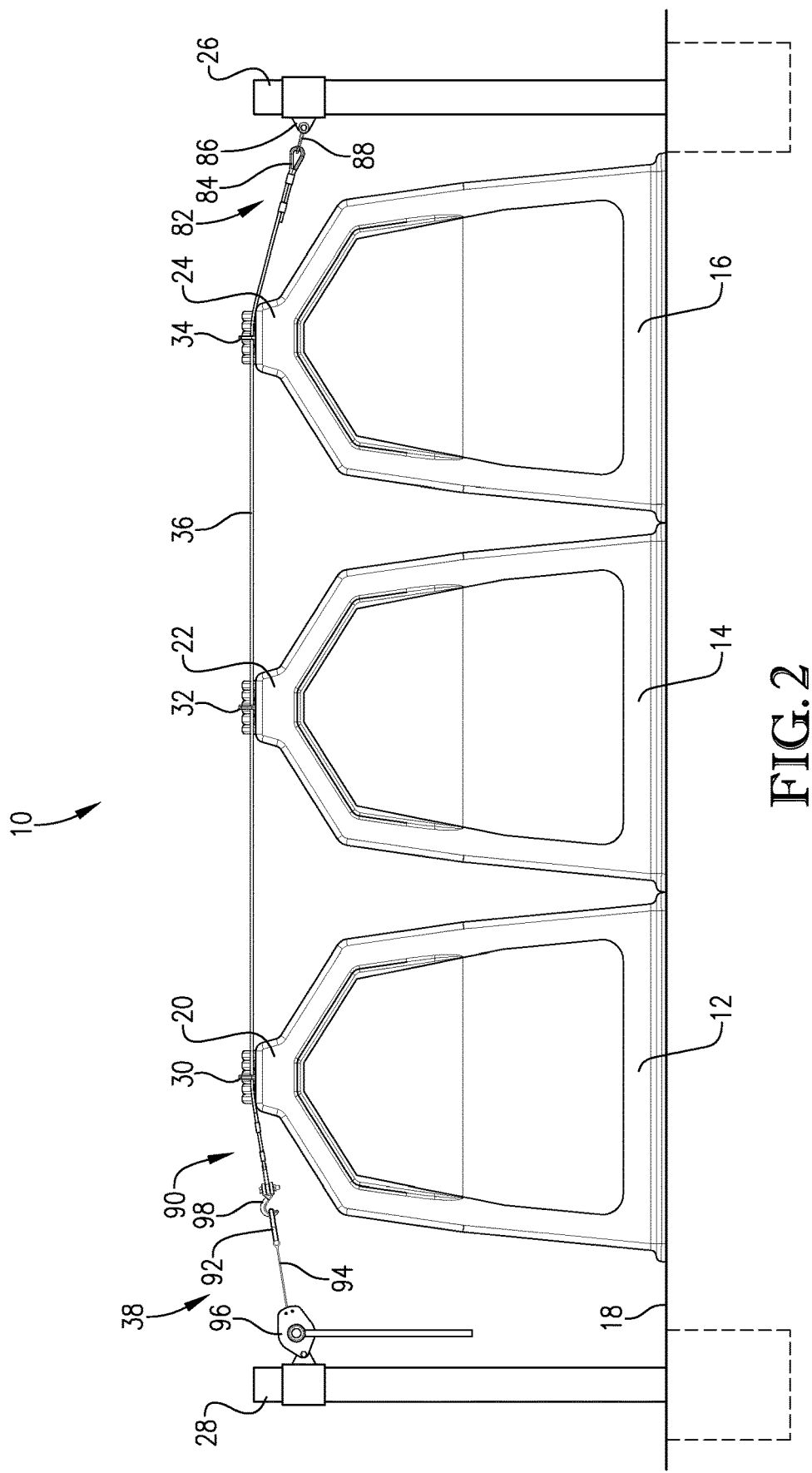
FIG. 2 is a front perspective view of the securement system of FIG. 1.

Turning to FIGS. 1 and 2, a securement system 10 for securing one or more calf hutches 12, 14, 16 to a ground surface 18 is depicted. The calf hutches 12, 14, 16 house one or more calves and protect them from the elements. The calf hutches 12, 14, 16 may be floorless structures that rest on the ground surface 18, and each includes a top portion 20, 22, 24, which may comprise a roof or other part of the calf hutches 12, 14, 16. The calf hutches 12, 14, 16 may be positioned near one or more anchoring structures 26, 28. The anchoring structures 26, 28 may comprise stakes, portions of a building, posts, or the like. As depicted in FIG. 1, the calf hutches 12, 14, 16 may be positioned between two anchoring structures 26, 28 partially buried in the ground surface 18 and/or concrete.

The securement system 10 broadly comprises latch assemblies 30, 32, 34 for each calf hutch 12, 14, 16, a line 36 that engages and is captured by the latch assemblies 30, 32, 34, and a ratchet assembly 38 for tightening the line 36. Although three latch assemblies 30, 32, 34 and three calf hutches 12, 14, 16 are illustrated, the securement system 10 may have any number of latch assemblies for securing any number of calf hutches.

The latch assemblies 30, 32, 34 may receive portions of the line 36 and may be attached to the top portions 20, 22, 24 of the calf hutches 12, 14, 16. Turning to FIGS. 3-7, one of the latch assemblies 30 constructed according to embodiments of the present invention is depicted and comprises a receiver flange 40, a latch arm 42, and a reinforcement plate 44. The receiver flange 40 may include two or more spaced-apart, vertically-extending plates 46, 48 that define a vertically-disposed channel 50 therebetween. Each of the plates 46, 48 include matching U-shaped recesses that together define a U-shaped locking slot 52 with an open end 54. The locking slot 52 and open end 54 are sized to receive a portion of the line 36. An abutment 56 (shown in FIGS. 5 and 6) is attached to the plates 46, 48 in the channel 50 to support a portion (described below) of the latch arm 42. Each of the plates 46, 48 may include horizontally-extending base portions 58, 60 that rest on the top portion 20 of the calf hutch 12 and have one or more holes 62. Fasteners 64 may extend through the holes 62 to secure the base portions 58, 60 to the top portion 20 of the calf hutch 12. The fasteners 64 may be bolts with nuts and/or washes. The fasteners 64 may alternatively or additionally include screws that engage the calf hutch 12. Additionally or alternatively, the base portions 58, 60 may comprise a unitary piece to which the vertically-extending plates 46, 48 are attached. In some embodiments, only one vertically-extending plate 46 may be used.

The reinforcement plate 44 is positioned on an interior surface 66 of the calf hutch 12 and reinforces the top portion 20 of the calf hutch 12 so that the latch assembly 30 has a stronger connection to the calf hutch 12. The reinforcement plate 44 may include holes 68 corresponding to the holes 62 of the base portions 58, 60 so that the fasteners 64 extending therethrough may engage the reinforcement plate 44. The fasteners 64 may then be tightened to sandwich the top portion 20 between the base portions 58, 60 and the reinforcement plate 44. The latch assembly 30 may be attached to the calf hutch 12 any number of ways without departing from the scope of the present invention.

Figure 3:
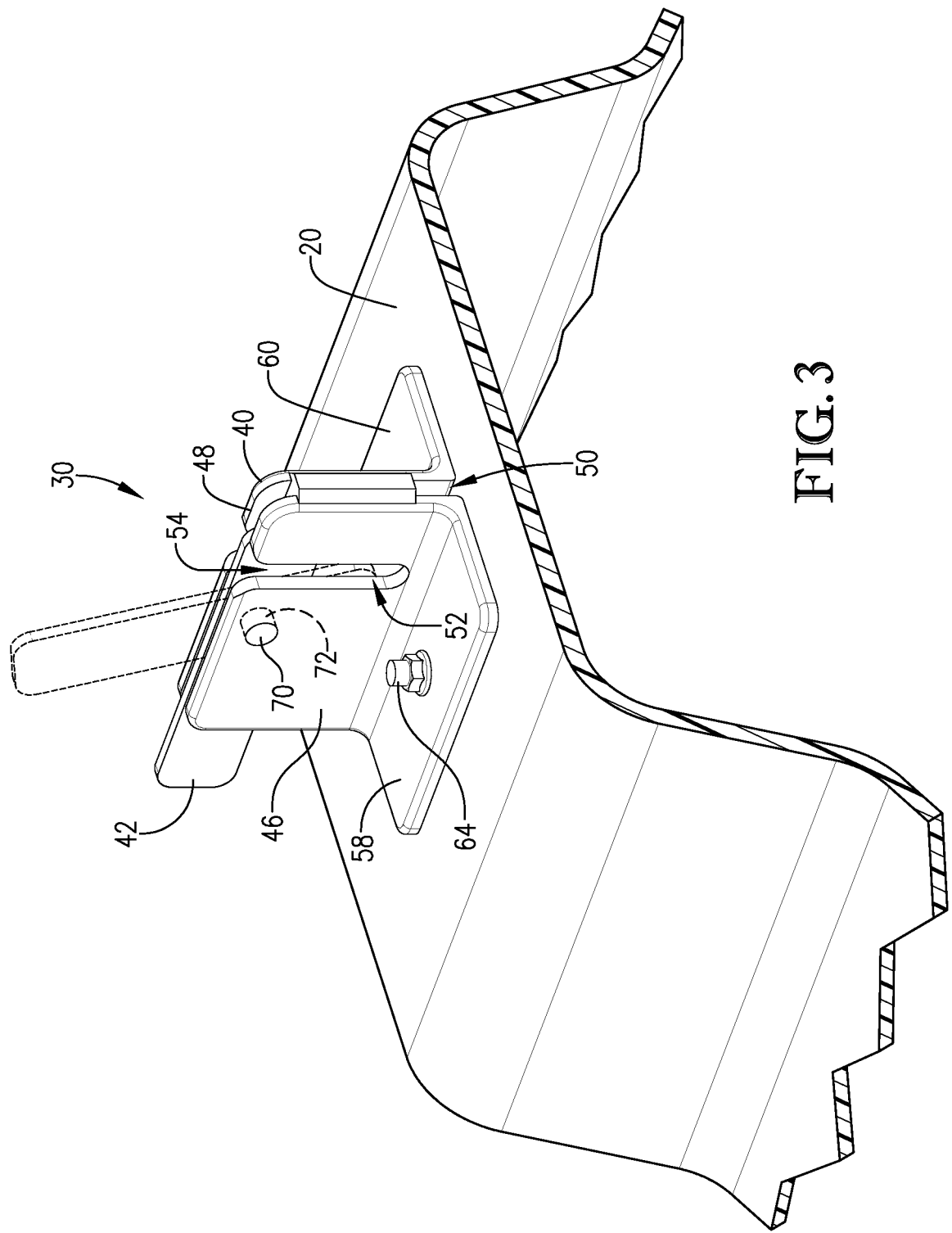
FIG. 3 is a perspective view of a latch assembly of the securement system of FIG. 1.
Figure 4:
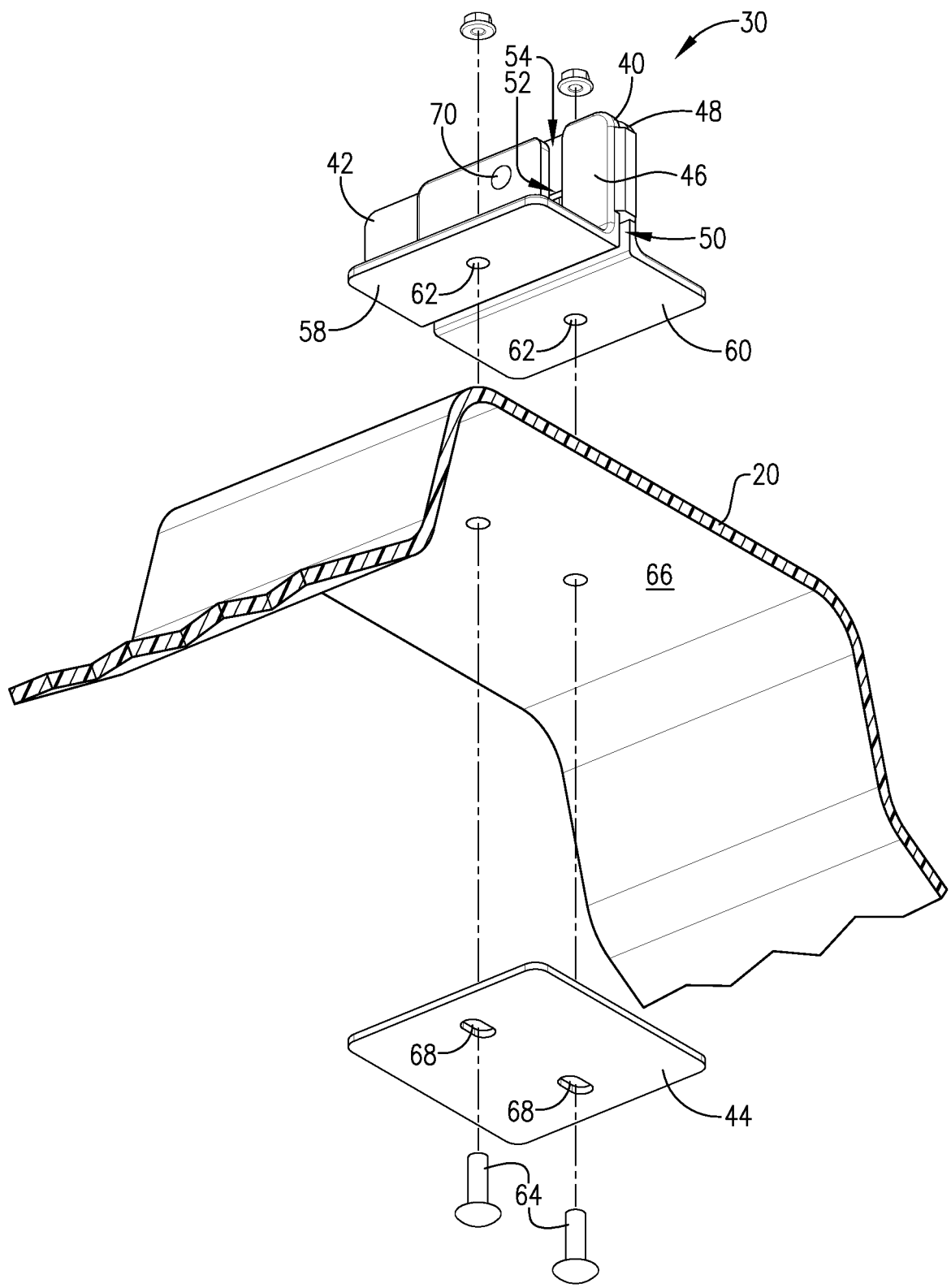
FIG. 4 is an exploded perspective view of the latch assembly of FIG. 3.
Figure 5:
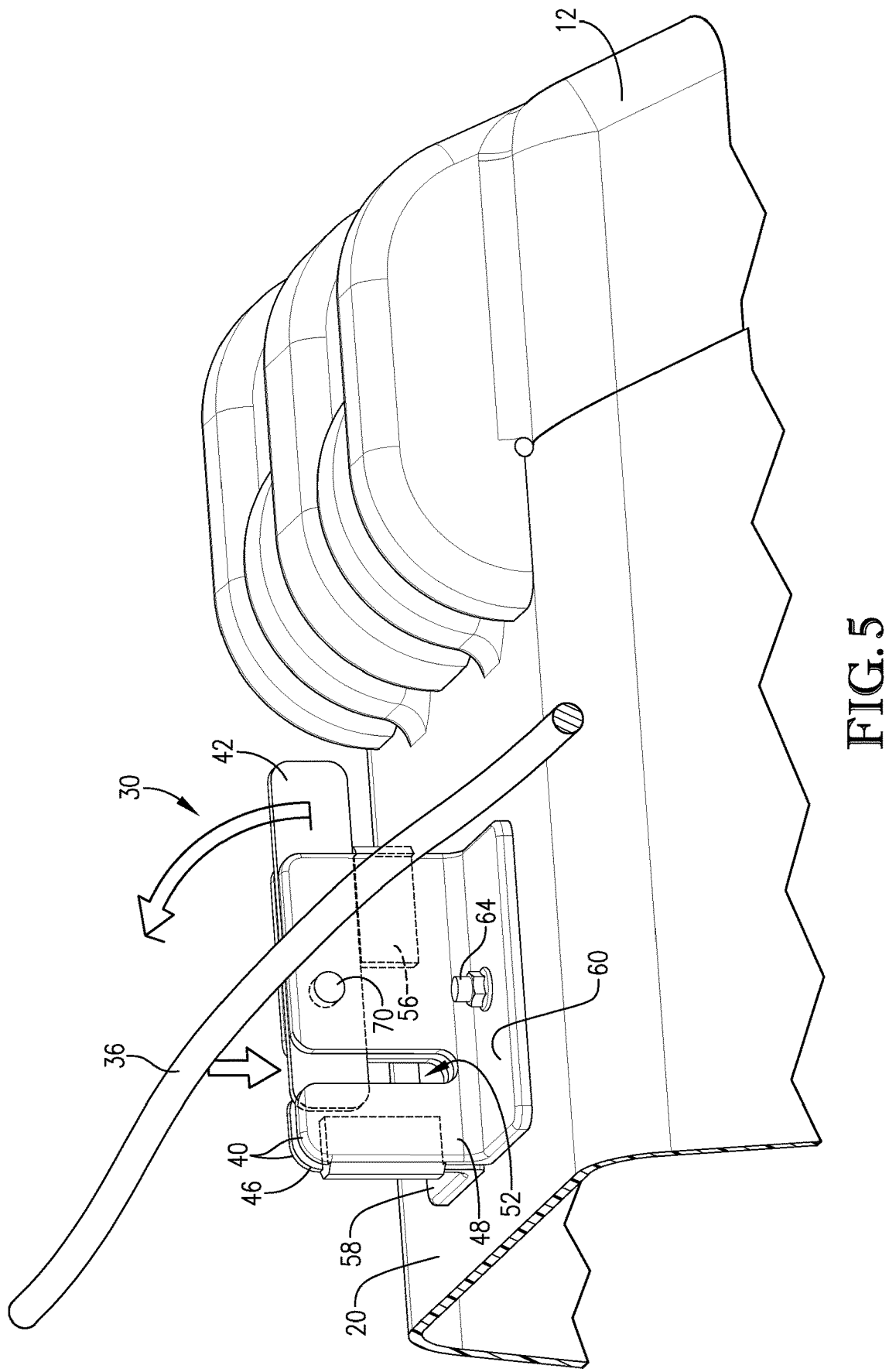
FIG. 5 is a perspective view of the latch assembly of FIG. 3 shifting to an open position.
Figure 6:
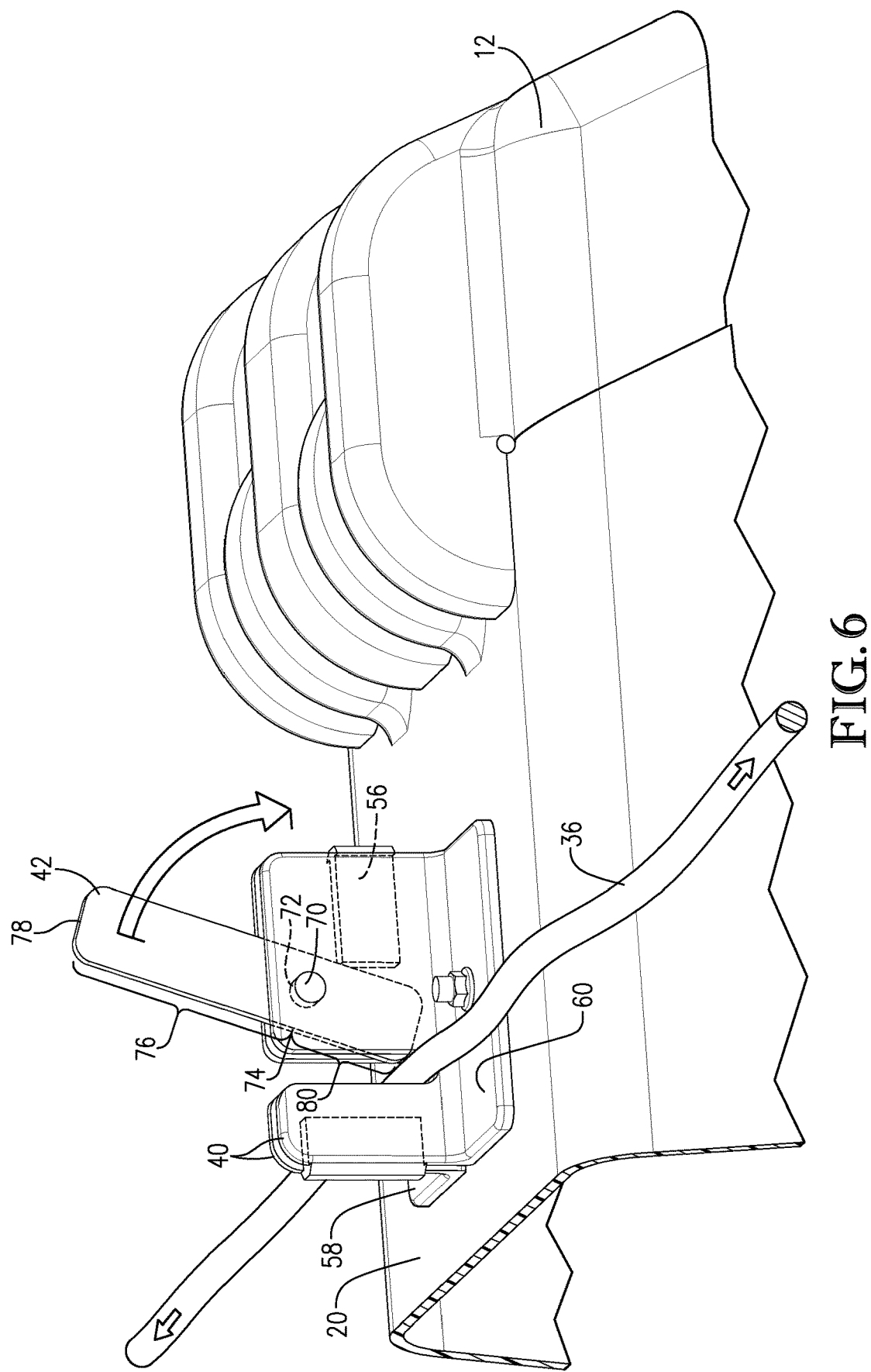
FIG. 6 is a perspective view of the latch assembly of FIG. 3 shifting to a closed position.
Figure 7:
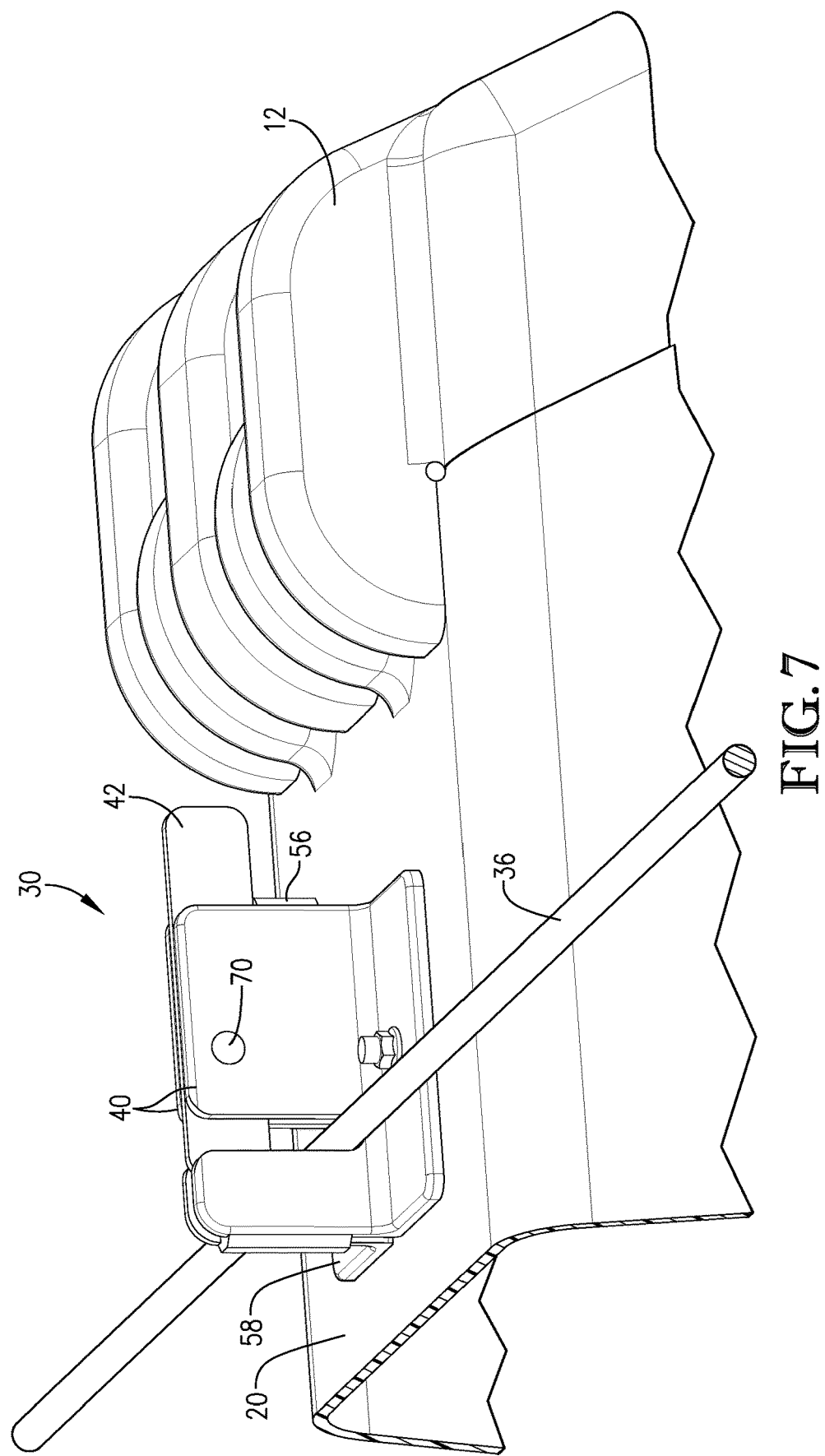
FIG. 7 is a perspective view of the latch assembly of FIG. 3 in the closed position and engaged with a line.

The latch arm 42 may be shifted between a closed position and an open position to capture the portion of the line 36 in the locking slot 52, as depicted in FIGS. 3, 5, and 6. In the closed position, the latch arm 42 blocks the open end 54 of the locking slot 52 (as shown in FIG. 7), and in the open position, the latch arm 42 does not block the open end 54 of the locking slot 52 (as shown in FIG. 6). The latch arm 42 is biased to the closed position so that once the portion of the line 36 enters the locking slot 52, it is captured therein as depicted in FIG. 7. The latch arm 42 may be pivotably mounted to the receiver flange 40 in the channel 50. A pivot pin 70 may extend horizontally between the vertical plates 46, 48 and through a hole 72 in the latch arm 42 to enable the latch arm 42 to pivot about the pin 70. The hole 72 may be located at a point 74 on the latch arm 42 so that gravity pulls a portion 76 of the latch arm 42 from the point 74 to an end 78 of the latch arm 42 downward to rest on the abutment 56 in the closed position. For example, the portion 76 may be longer and/or heavier than the rest 80 of the latch arm 42 so that pin 70 acts as a fulcrum, and gravity pulls the portion 76 down and the rest 80 of the latch arm 42 upward to block the open end 54 of the locking slot 52. The portion 76 may protrude from the receiver flange 40 for easy access and may be actuated or lifted to shift the latch arm 42 from the closed position to the open position. However, the latch arm 42 may be shifted in any manner, including pivoting, horizontal translation, etc., without departing from the scope of the present invention. Additionally or alternatively, the latch arm 42 may be biased via any method, such as via gravity, a spring, a resilient member, or the like, without departing from the scope of the present invention.

The line 36 may be secured to at least one of the anchoring structures 26, 28 and urged against the latch arm 42 to shift the latch arm 42 from its closed position to its open position to allow the portion of the line 36 to enter the open end 54 of the locking slot 52 and be captured by the latch assembly 30 when the latch arm 42 shifts back to its closed position to thereby secure the calf hutch 12 on the ground surface 18. The line 36 may comprise a cable, rope, twine, strap, wire, or the like.

Turning back to FIGS. 1 and 2, the line 36 may have a first end 82 attached to the first anchoring structure 26. The first end 82 may include a loop 84 for securing to the first anchoring structure 26. The loop 84 may be secured to the first anchoring structure 26 via a first catch 86. The first catch 86 may include a hook 88 that engages the loop 84. However, the first end 82 of the line 36 may be secured to the first anchoring structure 26 in any manner without departing from the scope of the present invention.

The ratchet assembly 38 secures a second end 90 of the line 36 to the second anchoring structure 28 and is configured to cinch the line 36 so that it is taut. The ratchet assembly 38 includes a second catch 92 attached to a strap 94 and a ratchet 96. The second catch 92 may comprise a loop, and the second end 90 of the line 36 may include a hook 98 that hooks onto the second catch 92. The ratchet 96 is configured to reel in the strap 94 to cinch the line 36 when it is secured to the strap 94. The second end 90 may be connected to the second anchoring structure 28 through additional or alternative means without departing from the scope of the present invention. Winding the line 36 in the ratchet 96 often causes frays, or other damage, to form on the line 36. By using the strap 94 and ratchet 96, the line 36 does not have to be wound up in the ratchet 96, and instead the more flexible strap 94 is wound in the ratchet 96. This reduces costs and labor associated with moving the calf hutch 12 to a different location.

The first catch 86 and ratchet assembly 38 may be positioned on the anchoring structures 26, 28 at heights that are lower than heights of the latch assemblies 30, 32, 34. This makes it so that the line 36 provides a downward force on the latch assemblies 30, 32, 34 and therefore the calf hutches 12, 14, 16 when the line 36 is cinched.

Figure 8:
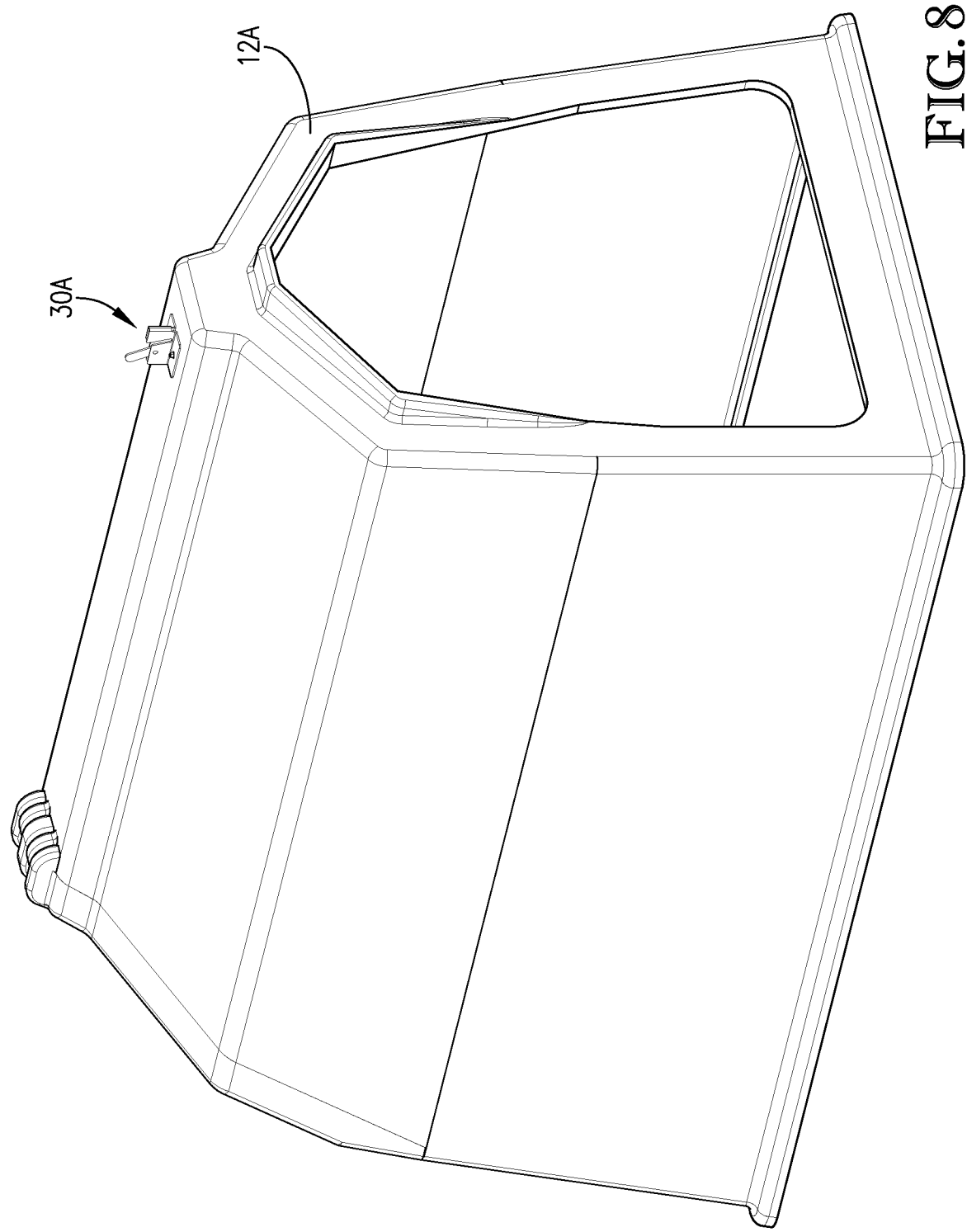
FIG. 8 is a perspective view of a securement system for securing one or more calf hutches constructed in accordance with another embodiment of the present invention.
Figure 9:
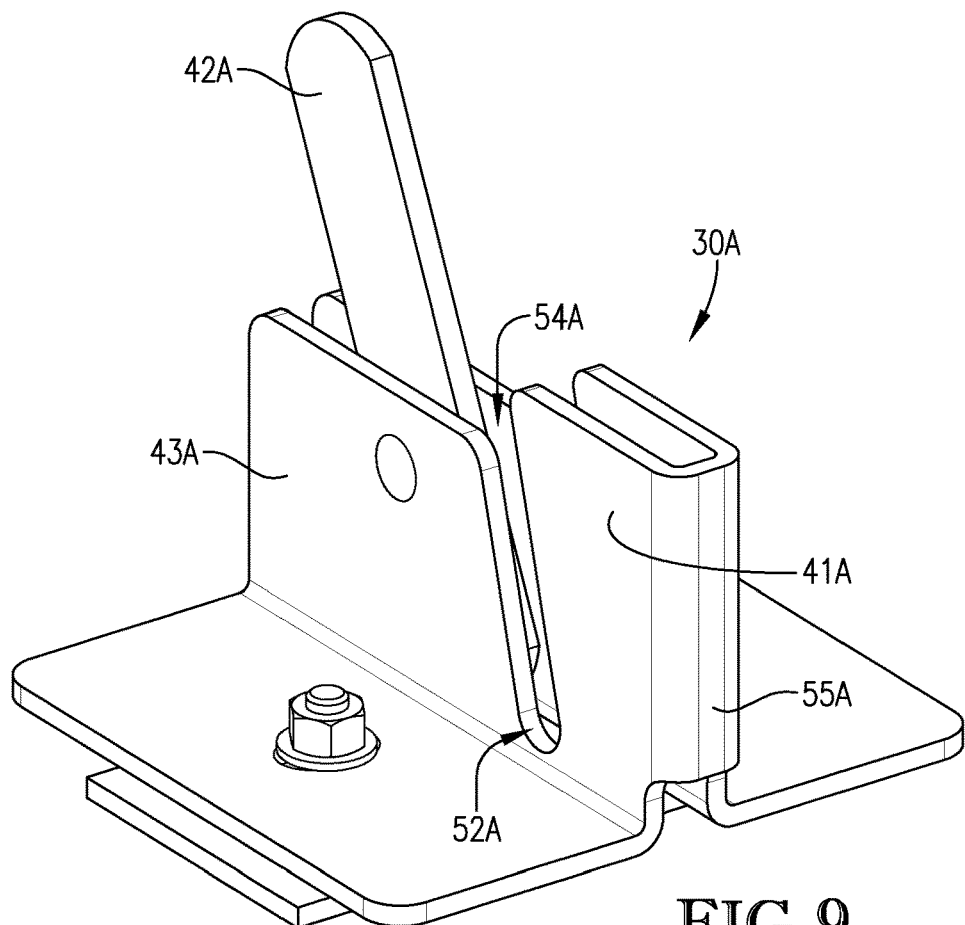
FIG. 9 is a perspective view of a latch assembly of the securement system of FIG. 8.
Figure 10:
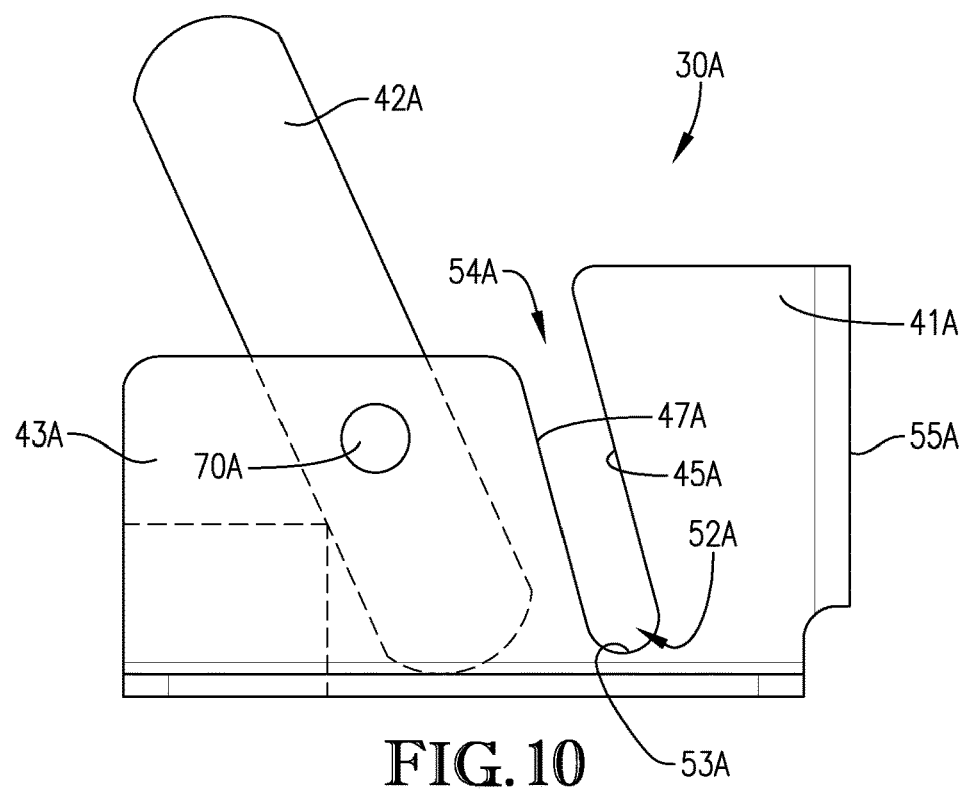
FIG. 10 is a side perspective view of the latch assembly of FIG. 9.

A latch assembly 30A constructed in accordance with another embodiment of the invention is shown in FIGS. 8-10. The latch assembly 30A may comprise substantially similar components as latch assembly 30; thus, the components of latch assembly 30A that correspond to similar components in latch assembly 30 have an 'A' appended to their reference numerals.

The latch assembly 30A attached to calf hutch 12A includes all the features of latch assembly 30 but its locking slot 52A is configured differently. The locking slot 52A is oblique to the latch arm 42A when latch arm 42A is in the closed position. The locking slot 52A is angled so that a bottom portion 53A of the locking slot 52A is closer to a front edge 55A of the receiver flange 40A than the open end 54A of the locking slot 52A. This allows the line 36A to be pulled to the bottom of the locking slot 52A away from the range of motion of the latch arm 42A, thereby preventing the latch arm 42A and the line 36A from getting jammed in the locking slot 52A. The locking slot 52A may be angled any number of ways without departing from the scope of the present invention.

Additionally, the receiver flange 40A includes a front portion 41A and back portion 43A that is shorter than the front portion 41A so that part of the front portion 41A acts as a catch for the line 36A. The front portion 41A includes a front slot edge 45A, and the back portion 43A includes a back slot edge 47A. The front slot edge 45A and the back slot edge 47A cooperatively define the locking slot 52A. The front slot edge 45A is longer than the back slot edge 47A so that the front slot edge 45A catches the line 36A when the line 36A is being pulled across the top of the receiver flange 40A toward the front portion 41A. The angle of the front slot edge 45A directs the line 36A into the locking slot 52A. This allows the line 36A to be engaged with the latch assembly 30A in a fast, simple motion and prevents the line 36A from sliding across the open end 54A of the locking slot 52A, which would cause the latching assembly 30A to fail to engage the line 36A.

Figure 11:
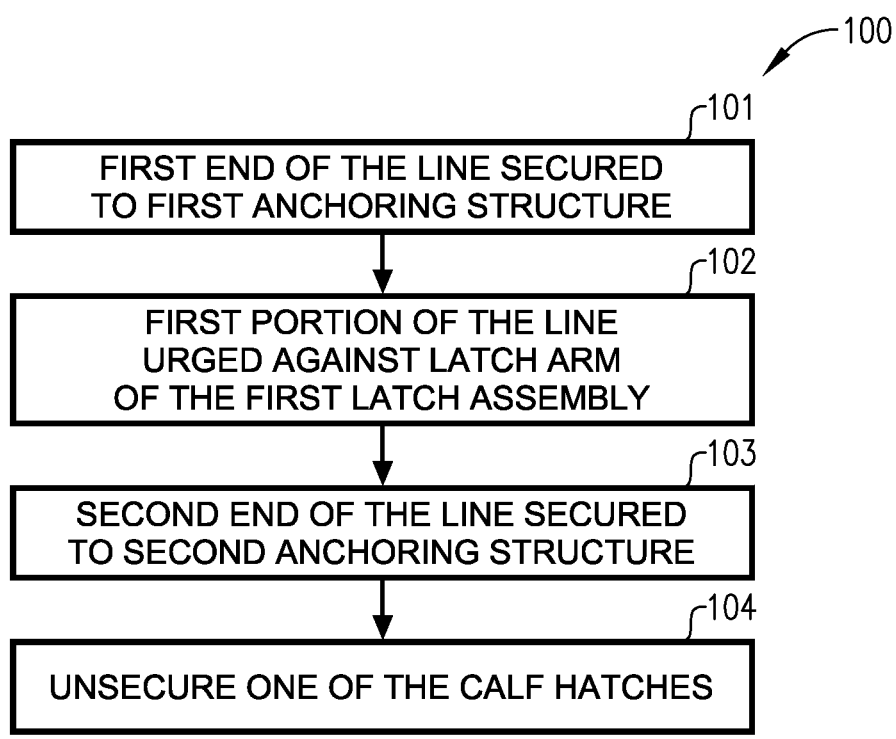
FIG. 11 is a flow chart illustrating a method for securing a plurality of calf hutches according to embodiments of the present invention.

The flow chart of FIG. 11 depicts the steps of an exemplary method 100 of securing a plurality of calf hutches to a ground surface. In some alternative implementations, the functions noted in the various blocks may occur out of the order depicted in FIG. 11. For example, two blocks shown in succession in FIG. 11 may in fact be executed substantially concurrently, or the blocks may sometimes be executed in the reverse order depending upon the functionality involved. In addition, some steps may be optional.

Referring to step 101, the first end of the line may be secured to the first anchoring structure. The first end may be secured via its loop engaging the hook of the first catch. The first catch may be positioned at a height lower than the height of the calf hutches.

Referring to step 102, a first portion of the line is urged against the latch arm of one of the latch assemblies attached to the top portion of one of the calf hutches so that the latch arm shifts from the closed position to the open position to allow the first portion of the line to enter the locking slot of the latch assembly and be captured by the latch assembly when the latch arm shifts back to the closed position. This step 102 may be repeated for each calf hutch that is to be secured to the ground surface.

Referring to step 103, the second end of the line is secured to the second anchoring structure. The second end may be secured via its hook engaging the second catch of the ratchet assembly, which is attached to the second anchoring structure. The ratchet assembly may be positioned at a height lower than the height of the calf hutches. This step 103 may further comprise tightening the line via the ratchet. This step 103 may be performed before or after step 102 due to the ability of the latch assemblies to receive the portions of the line. This step 103 may be also be performed without having to thread the line through the locking slot of each latch assembly. Additionally, step 102 may be performed again after step 103 if an additional calf hutch is to be secured to the ground surface.

Referring to step 104, one of the calf hutches may be unsecured. This may be performed by actuating the portion of the latch arm so that the latch arm shifts from the closed position to the open position. The portion of the line inside that latch assembly may then be removed from inside the locking slot.

The method 100 may include additional, less, or alternate steps and/or device(s), including those discussed elsewhere herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An animal shelter assembly comprising:
   a calf hutch comprising a roof and a plurality of walls attached to the roof; and
   a latch attached to the roof of the calf hutch, the latch comprising—
      a back portion attached to the roof of the calf hutch;
      a latch arm secured to the back portion and having a first portion pivotable between a closed position and an open position in which the first portion pivots about a pivot point downwardly thereby defining a range of motion, the first portion being biased to the closed position and having first end proximal to the pivot point and a second end opposite to the first end, the second end located at a first radial distance from the pivot point; and a front portion that defines a locking slot with the back portion, the locking slot comprising:

an open end that is blocked when the latch arm is in the closed position and that is not blocked by the latch arm when the latch arm is in the open position, and a bottom portion that is outside the range of motion of the latch arm and located at a second radial distance from the pivot point, the second radial distance being longer than the first radial distance.

2. The animal shelter assembly of claim 1, wherein the back portion includes a base portion having a first hole that receives a fastener to attach the latch to the roof of the calf hutch.

3. The animal shelter assembly of claim 2, wherein the latch comprises a reinforcement plate for positioning on an interior surface of the roof of the calf hutch and having a second hole corresponding to the first hole so that the second hole may also receive the fastener.

4. The animal shelter assembly of claim 1, wherein the locking slot is oblique to the latch arm when the latch arm is in the closed position.

5. The animal shelter assembly of claim 1, wherein the front portion has a front end, and the open end of the locking slot is farther away from the front end than a remainder of the locking slot.

6. The animal shelter assembly of claim 1, wherein the latch arm is pivotably mounted to the back portion via a pivot pin.

7. The animal shelter assembly of claim 1, wherein the bottom portion comprises two spaced-apart vertically-extending plates that define a vertically-disposed channel therebetween in which the latch arm is pivotally-mounted.

8. A latch assembly for attaching to a roof of a calf hutch and for use with a cable to secure the calf hutch, the latch assembly comprising:

a reinforcement plate for positioning on an interior surface of the roof of the calf hutch and having a first hole operable to receive a fastener;

a back portion having a second hole that receives the fastener so that the reinforcement plate and the back portion are operable to sandwich the roof of the calf hutch;

a latch arm secured to the back portion and having a first portion pivotable between a closed position and an open position in which the first portion pivots about a pivot point downwardly thereby defining a range of motion, the first portion being biased to the closed position and having first end proximal to the pivot point and a second end opposite to the first end, the second end located at a first radial distance from the pivot point; and a front portion that defines a locking slot with the back portion, the locking slot comprising:

an open end that is blocked when the latch arm is in the closed position and that is not blocked by the latch arm when the latch arm is in the open position, and a bottom portion that is outside the range of motion of the latch arm and located at a second radial distance from the pivot point, the second radial distance being longer than the first radial distance.

9. The latch assembly of claim 8, wherein the front portion has a front slot edge and the back portion has a back slot edge, the front slot edge and the back slot edge cooperatively defining the locking slot, the front portion being taller than the back portion so that the front slot edge is longer than the back slot edge.

10. The latch assembly of claim 9, wherein the front portion includes a front edge and the locking slot is oblique to the latch arm when the latch arm is in the closed position so that the open end of the locking slot is farther form the front edge of the front portion than a bottom portion of the locking slot.

11. A latch for attaching to a calf hutch and for use with a cable to secure the calf hutch, further the latch comprising:

a back portion including a base portion having a first hole that receives a fastener to attach the latch to the calf hutch;

a latch arm secured to the back portion and having a first portion pivotable between a closed position and an open position in which the first portion pivots about a pivot point downwardly thereby defining a range of motion, the first portion being biased to the closed position and having first end proximal to the pivot point and a second end opposite to the first end, the second end located at a first radial distance from the pivot point;

a front portion that defines a locking slot with the back portion, the locking slot comprising:

an open end that is blocked when the latch arm is in the closed position and that is not blocked by the latch arm when the latch arm is in the open position, and a bottom portion that is outside the range of motion of the latch arm and located at a second radial distance from the pivot point, the second radial distance being longer than the first radial distance; and a reinforcement plate for positioning on an interior surface of the calf hutch and having a second hole corresponding to the first hole so that the second hole may also receive the fastener.

* * * * *